(12) United States Patent
Williams et al.

(10) Patent No.: US 9,830,641 B2
(45) Date of Patent: Nov. 28, 2017

(54) ORDERING SYSTEMS AND METHOD (71) Applicant: General Motors, LLC, Detroit, MI (US)

(72) Inventors: Nate Williams, Ann Arbor, MI (US); Marco T. Carnevale, Windsor (CA); Dario A. Lencina Talarico, Birmingham, MI (US); Vijay Vardhan, Sterling Heights, MI (US); Paul H. Pebbles, Novi, MI (US)

(73) Assignee: General Motors LLC, Detroit, MI (US)

( * ) Notice: Subject to any disclaimer, the term of this patent is extended or adjusted under 35 U.S.C. 154(b) by 128 days.

(21) Appl. No.: 14/572,187

(22) Filed: Dec. 16, 2014

(65) Prior Publication Data

US 2016/0171591 A1    Jun. 16, 2016

(51) Int. Cl.
*G06Q 30/06* (2012.01)
*A47J 37/06* (2006.01)
*G06Q 50/12* (2012.01)

(52) U.S. Cl.
CPC ....... *G06Q 30/0635* (2013.01); *A47J 37/0611* (2013.01); *G06Q 50/12* (2013.01)

(58) Field of Classification Search
CPC .............. G06Q 30/0601; G06Q 50/12; G06Q 10/0834; G06Q 50/28; G06Q 30/06; A47J 37/0611
See application file for complete search history.

(56) References Cited

U.S. PATENT DOCUMENTS

| | | | |
|---|---|---|---|
| 2010/0280956 A1* | 11/2010 | Chutorash | G06Q 20/20 705/64 |
| 2012/0290390 A1* | 11/2012 | Harman | G06Q 30/06 705/14.53 |
| 2014/0025540 A1* | 1/2014 | Hendrickson | G06Q 30/02 705/26.81 |
| 2014/0058901 A1* | 2/2014 | Kim | G06Q 30/06 705/26.81 |
| 2014/0222623 A1* | 8/2014 | Napper | B25B 11/00 705/26.81 |
| 2014/0279270 A1 | 9/2014 | Bertanzetti et al. | |
| 2015/0262121 A1* | 9/2015 | Riel-Dalpe | G06Q 10/08 705/15 |
| 2016/0275470 A1* | 9/2016 | Straw | G06Q 30/06 |

* cited by examiner

*Primary Examiner* — Sonji Johnson
(74) *Attorney, Agent, or Firm* — Harness, Dickey & Pierce, P.L.C.

(57) ABSTRACT

In an example of an ordering method, an application receives an order for a product. The application may be an in-vehicle application resident on a memory of an in-vehicle infotainment unit of a vehicle or a mobile-device application resident on a memory of a mobile device. Without contacting a merchant of the product, the application determines a preparation time for the product. The application dynamically determines an estimated time of arrival of the vehicle or the mobile device at a location of the merchant. The application holds the order for the product until the estimated time of arrival is equal to or less than the preparation time for the product.

18 Claims, 2 Drawing Sheets

ORDERING SYSTEMS AND METHOD

TECHNICAL FIELD

The present disclosure relates generally to ordering systems and an ordering method.

BACKGROUND

Various commercial establishments are designed to provide services and/or products to customers in exchange for payment. Wireless communication technologies have been integrated into some commercial transactions with customers. As an example, short range wireless communication technologies have been leveraged, for example, in smart cards and key fob devices, to provide the customer with fast and easy payment methods. The smart card may be used to render the payment by waving the card near a card reader. The key fob device may be programmed with credit or debit information, and this programmed key fob may be waved near a reader to render the payment.

SUMMARY

In an example of an ordering method, an application receives an order for a product. The application may be an in-vehicle application resident on a memory of an in-vehicle infotainment unit of a vehicle or a mobile-device application resident on a memory of a mobile device. Without contacting a merchant of the product, the application determines a preparation time for the product. The application dynamically determines an estimated time of arrival of the vehicle or the mobile device at a location of the merchant. The application holds the order for the product until the estimated time of arrival is equal to or less than the preparation time for the product.

Also disclosed herein are ordering systems.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method and systems disclosed herein enable a vehicle or mobile device user to order an item/product (e.g., an edible product) using an application resident on a memory of the vehicle or mobile device. The application receives the order, and holds the order. While holding the order, the application compares the vehicle's or mobile device's estimated time of arrival of the vehicle or mobile device at a merchant/vendor of the ordered item. When the application recognizes that the estimated time of arrival is equal to or less than a preparation time of the ordered item, the application will transmit the order to the merchant/vendor. The merchant/vendor does not receive the order until the user is located close enough to the merchant/vendor's place of business for the item to then be processed and ready for pick up upon the user's arrival. This ensures that the item is fresh (e.g., if an edible product, such as food or drink) and/or prepared or ready in a timely manner. Basing the transmission of the order to the merchant/vendor on the estimated time of arrival and on the preparation time of the item can create a better experience for the customer by reducing his/her wait time at the merchant/vendor and/or by delivering him/her a fresh item, and can also facilitate operating efficiency at the merchant/vendor.

It is to be understood that, as used herein, the term "user" includes a vehicle owner or another authorized driver of the vehicle, or a mobile device owner or another authorized use of the mobile device.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 1:
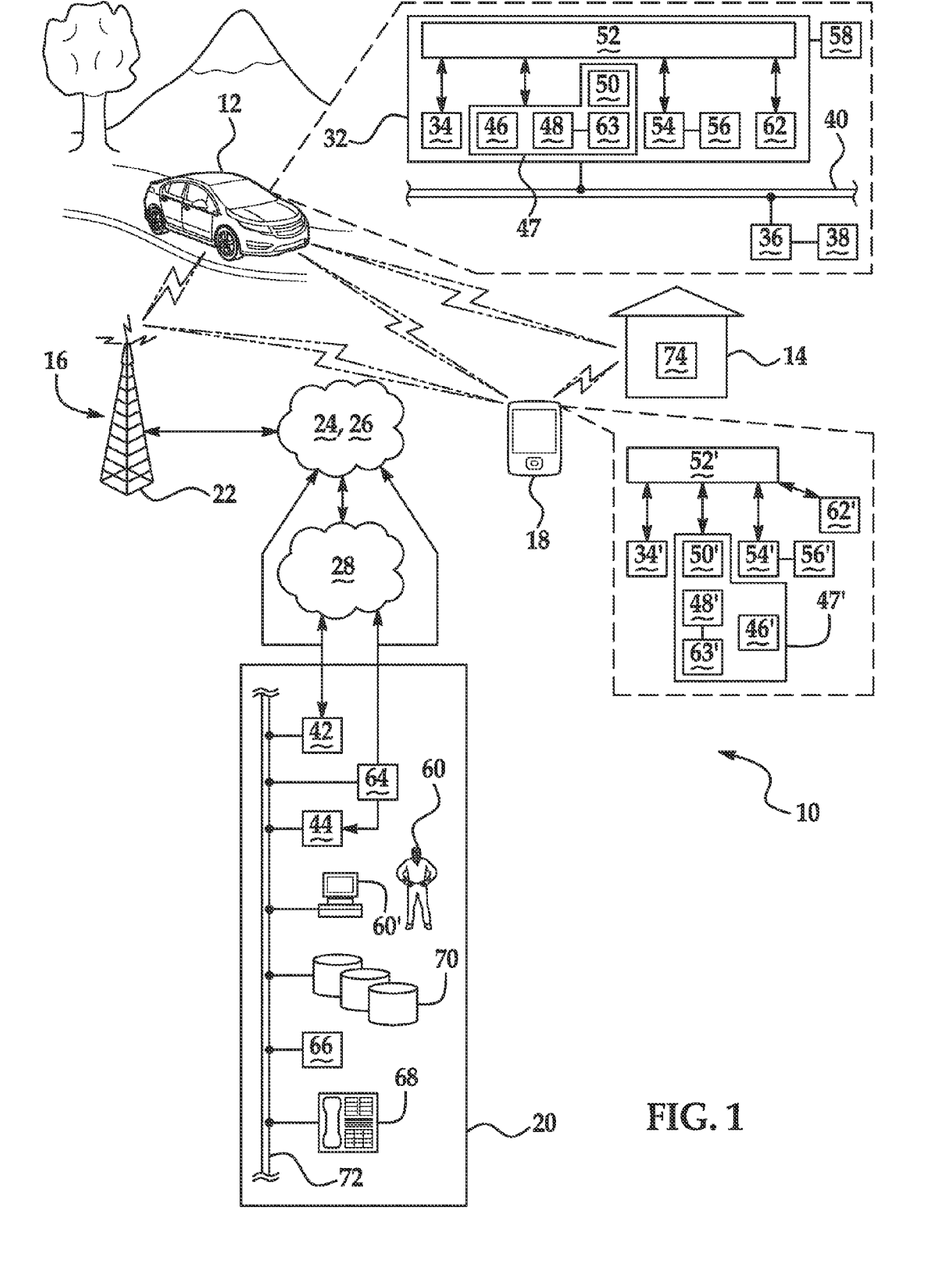
FIG. 1 is a schematic view of an example of an ordering system for performing an example of an ordering method.

FIG. 1 depicts an example of a system 10 for performing examples of the ordering method disclosed herein. Some examples of the system 10 include the vehicle 12, the merchant 14, and the carrier/communication system 16. Other examples of the system 10 include the mobile device 18, the merchant 14, and the carrier/communication system 16. Either of these examples of the system 10 may also include a center 20 that provides back end services to the vehicle 12 or the mobile device 18.

Phone calls and/or messages (e.g., the order for the item, etc.) may be transmitted to, from, and/or between communication component(s) of the vehicle 12, the mobile device 18, communication component(s) of the merchant 14, and/or communication component(s) of the center 20 using the carrier/communication system 16. The communication links between the various components are shown as lightning bolts in FIG. 1.

In an example, the carrier/communication system 16 is a two-way radio frequency (RF) communication system. The carrier/communication system 16 may include one or more cell towers 22 or satellites (not shown). It is to be understood that the carrier/communication system 16 may also include one or more base stations and/or mobile switching centers (MSCs) 24 (e.g., for a 2G/3G network), one or more evolved Node Bs (eNodeB) and evolved packet cores (EPC) 26 (for a 4G (LTE) network), and/or one or more land networks 28. The carrier/communication system 16 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/ communication system 16 may be GSM (global system for mobile telecommunications), CDMA2000, UMTS (universal mobile telecommunications system), LTE (long-term evolution), or some other available architecture.

An Internet connection may also be utilized for the transmission of the message(s) (e.g., transmission of the user's order from the vehicle 12 or mobile device 18 to the merchant 14). The transmission of the messages may be made using the carrier/communication system 16, either through the vehicle's Internet connection (e.g., when the vehicle 12 is equipped with a 4G long-term evolution, LTE, or other suitable Internet connection) or through the mobile device's cellular and Internet connection. In some instances, the vehicle 12 (rather than the mobile device 18) may utilize the mobile device's cellular and Internet connection. When the vehicle 12 utilizes the mobile device's cellular Internet connection, it is to be understood that vehicle 12 is connected to the cellular and Internet connection through a short range wireless communication link with the mobile device 18 (which, in these instances, is present in the vehicle 12).

In the system 10, the vehicle 12 may be a car, motorcycle, truck, or recreational vehicle (RV) that is equipped with suitable hardware and computer readable instructions/code that enable it to communicate (e.g., transmit and/or receive voice and data communications) over the carrier/communication system 16 and/or using the short range wireless communication link.

As shown in FIG. 1, the vehicle 12 includes an infotainment unit 32 (sometimes referred to as a vehicle communications platform (VCP)). The in-vehicle infotainment unit 32 is an on-board vehicle dedicated communications and entertainment device. In another example (not shown), the in-vehicle infotainment unit 32 is an on-board vehicle dedicated entertainment device that is in operative communication with a separate on-board vehicle dedicated communications device (e.g., a telematics unit). Whether integrated into a single unit (e.g., infotainment unit 32) or included as separate units, the on-board vehicle dedicated communications and entertainment device(s) include hardware components that are capable of running computer readable instructions/code, which are embodied on non-transitory, tangible computer readable media.

The in-vehicle infotainment unit 32 may provide a variety of services, both individually and through its communication with the center 20 (e.g., which may be a facility that is owned and operated by an in-vehicle infotainment unit service provider). Several examples of these services include, but are not limited to: turn-by-turn directions and other navigation-related services provided in conjunction with a location detection module 34; airbag deployment notification and other emergency or roadside assistance-related services provided in connection with various sensor interface modules 36 and sensors 38 located throughout the vehicle 12; and infotainment-related services where music, Web pages, movies, television programs, videogames and/or other content is downloaded by the infotainment unit 32 via a vehicle bus system 40 and an audio bus system (not shown). The listed services are by no means an exhaustive list of all the capabilities of the infotainment unit 32, but are simply an illustration of some of the services that the in-vehicle infotainment unit 32 is capable of offering.

As noted above, the infotainment unit 32 may be used for vehicle communications. Some vehicle communications (e.g., between the vehicle 12 and a switch 42 or a remote content server 44 at the center 20) utilize radio or satellite transmissions to establish a voice channel with the carrier/communication system 16 such that both voice and data transmissions may be sent and received over the voice channel. In some instances, vehicle communications are enabled through the infotainment unit 32 via a communications module 47, which includes a cellular chipset/component 46 for voice communications and a data transmission system 48 for data transmission. In an example, the data transmission system 48 may include a packet builder, which is programmed to make decisions about what packet to send (e.g., bandwidth, data to include, etc.) and to actually build the packet data message. In another example, the data transmission system 48 may include a wireless modem, which applies some type of encoding or modulation to convert the digital data so that it can communicate through a vocoder or speech codec incorporated in the cellular chipset/component 46. It is to be understood that any suitable encoding or modulation technique that provides an acceptable data rate and bit error may be used with the examples disclosed herein. While examples have been provided, it is to be understood that any suitable data transmission system 48 may be used.

The cellular chipset/component 46 of the infotainment unit 32 may be an analog, digital, dual-mode, dual-band, multi-mode and/or multi-band wireless transceiver. The cellular chipset-component 46 uses one or more prescribed frequencies in the standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

The in-vehicle infotainment unit 32 may also be configured for short range wireless communication technologies, such as BLUETOOTH® and various classes thereof, dedicated short-range communications (DSRC), or WI-FI™ and various classes thereof. In these instances, the cellular chipset/component 46 may operate in conjunction with a short range wireless communication unit 50 of the infotainment unit 32. As described above, the vehicle 12 may utilize the mobile device's cellular and Internet connection by connecting to the mobile device 18 through short range wireless communications. The use of short-range wireless communication technologies will depend, at least in part, on the distance of the vehicle 12 from the mobile device 18. For example, when the short range wireless communication unit 50 is configured for some BLUETOOTH® connections, the short-range wireless communication unit 50 may have a preset wireless access range, or may have a standard range from about 10 meters (i.e., about 32 feet) to about 91 meters (i.e., about 300 feet).

The infotainment unit 32 generally includes an electronic processing device 52 operatively coupled to one or more types of electronic memory 54, which has the in-vehicle application 56 resident thereon. In an example, the electronic processing device 52 is a micro-processor. In other examples, the electronic processing device 52 may be a micro controller, a controller, a host processor, and/or a vehicle communications processor. In another example, electronic processing device 52 may be an application specific integrated circuit (ASIC). Alternatively, electronic processing device 52 may be a processor working in conjunction with a central processing unit (CPU) performing the function of a general-purpose processor.

The electronic memory 54 of the infotainment unit 32 may be an encrypted memory that is configured to store i) computer readable instructions/code to be executed by the processor 52, ii) a data table containing order items, each of which is associated with a preparation time and an associated vendor, iii) data associated with the various systems of the vehicle 12 (i.e., vehicle data), and the like. In an example, the electronic memory 54 stores the in-vehicle application 56. The electronic memory 54 may also store the unique identifying code that can be used to establish a short range wireless communication link with the mobile device 18.

In some examples, the previously mentioned in-vehicle application 56 may be downloaded (e.g., from an online application store or marketplace) and stored on the electronic memory 54. The in-vehicle application 56 includes a user interface that enables the user to input his/her order for an item, and computer readable instructions for performing various tasks upon receiving the item order.

The application 56 may be opened using an in-vehicle display 58. The display 58 may be operatively directly connected to or in communication with the infotainment unit 32. Examples of the display 58 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 58 is a full-color touch screen display.

The application 56 may or may not require the user to log in. Once opened, the user interface of the application 56 enables the user to select an item that he/she would like to order from a particular merchant/vendor 14. In an example, a data table is presented to the user on the display 58, and the user selects the item(s) from the data table. The data table may include multiple order items from a single merchant/vendor 14 or from two or more distinct merchants/vendors 14. Within the data table, each of the order items may be linked to the particular merchant/vendor 14 that offers that item. In one example, the user may input his/her selected item(s) using the display touch screen or by speaking his/her selection into a microphone (e.g., when the application 56 is capable of speech recognition). Additionally, the user may use a search feature/box presented by the user interface to search through the data table for all of the items available from a particular merchant/vendor 14, or for a particular type of item (e.g., coffee) that is available from different merchants/vendors 14. In this example, the user can type in the desired merchant/vendor 14 or item, and the application 56 will search the data table for the particular merchant/vendor 14 or item.

The application 56 may also allow the user to create a favorite items list that he/she can access through the user interface to select his/her order item, rather than having to use the data table each time an order is placed.

When a user inputs his/her item selection, the application 56 may be programmed to ask the user which location of the merchant/vendor 14 (if multiple locations are available) the user would like to place the order with. In one example, the data table contains the addresses of the merchants/vendors 14 and displays them for the user. In this example, the user selects the merchant/vendor location from the list. In another example, the application 56 is programmed to recognize the vehicle's then-current location (through the location detection module 34) and to obtain the closest locations of the merchant/vendor 14 from an on-board navigation system connected to the location detection module 34. In still another example, the application 56 is programmed to recognize the vehicle's then-current location (through the location detection module 34) and to obtain the closest locations of the merchant/vendor 14 from an external information source through the carrier/communication system 16. In an example, the external information source is a wirelessly accessible database that contains site information data (building names, addresses, representative structures, etc.). In the examples disclosed herein involving the vehicle 12, the closest locations may be the store or other facility of the merchant/vendor that is the closest in distance or travel time to the vehicle 12. Once obtained by the application 56, the user interface displays the closest merchant/vendor location(s) for the user's selection.

In an example, the user may select a large black coffee as the item to be ordered and then select Coffee Shop X located at 1 XYZ lane as the merchant/vendor location to place the order. The application 56 receives the order, but does not yet send the order to the selected merchant/vendor 14. Rather, the application 56 is capable of holding the user's order and the merchant/vendor location until an estimated time of arrival of the vehicle 12 correlates with (i.e., is equal to or less than) the preparation time of the merchant/vendor 14 for that particular item. As such, the order is not placed with the merchant/vendor immediately. In the examples disclosed herein, the actual submission of the order to the merchant/vendor 14 is delayed until the arrival time of the vehicle 12 is within a preparation time of the merchant/vendor 14. The application 56 includes a holding queue that stores the order until it is time to send the order to the merchant/vendor 14.

While the order is held in the holding queue, the application 56, in conjunction with one or more modules of the infotainment unit 32, determines a preparation time of the order item, dynamically determines the estimated time of arrival of the vehicle 12 at the merchant/vendor location, and compares the preparation time with the estimated time of arrival to determine whether the order should be transmitted to the merchant/vendor 14.

In the examples disclosed herein, the application 56 does not contact the merchant/vendor 14 to determine the preparation time. Rather, the application 56 accesses a published list of preparation times, runs an algorithm for determining the preparation time, or requests the preparation time from the remote content server 44.

In one example, the data table (saved in the memory 54) containing the multiple order items and the associated merchant/vendor 14 also includes the merchant's preparation times for the items. This information may be updated through software updates downloaded to the controller/processor 52. The application 56 may look up the preparation time for the order item in the data table.

In another example, the application 56, using controller/processor 52, runs an algorithm to determine the preparation time for the particular item. The algorithm may take into account the time of day at which the order is placed, the type of item being ordered, the typical preparation time of the item, the total size of the user's order, and the historical turn-around time data for the merchant/location at the time of day. As an example of the step-by-step procedure that is performed when the algorithm is run is shown in the table below:

At the first step (1.), the default preparation time of the merchant/vendor 14 is looked up. At step (2.), it is determined whether the time at which the order is received is historically a busy time period for the merchant/vendor 14. If the order time is a historically busy time, the process moves to step (3.), where the default preparation time is adjusted (e.g., increased) taking into account any delay resulting from the busy time period. The process then moves to step (4.). If, however, the order time is not a historically busy time, the process skips step (3.) and moves directly to step (4.). At step (4.), it is determined whether the order is particularly large. If the order is particularly large, the process moves to step (5.), where the previously adjusted preparation time (if step (3.) was performed) or default preparation time (if step (3.) was not performed) is adjusted (e.g., increased), taking into the time it takes to prepare the individual items in the large order. The process then moves to step (6.). If, however, the order is not particularly large, the process skips step (5.) and moves directly to step (6.). At step (6.), it is determined whether the order contains any special requests (e.g., skim milk, no lettuce, gluten free, etc.). If the order contains a special request(s), the process moves to step (7.), where the previously adjusted preparation time (if steps (3.) and/or (5.) was/were performed) or default preparation time (if steps (3.) and (5.) were not performed) is adjusted, taking into the time it takes to accommodate the special request(s). The process then moves to step (8.). If, however, the order does not contain a special request(s), the process skips step (7.) and moves directly to step (8.). At step (8.), it is determined whether the order contains any other potential preparation time adjusting factors. If the order contains another potential preparation time adjusting factor(s), the process moves to step (9.), where the previously adjusted preparation time (if steps (3.) and/or (5.) and/or (7.) was/were performed) or default preparation time (if steps (3.), (5.) and (7.) were not performed) is adjusted, taking into the time it takes to accommodate the other potential preparation time adjusting factor(s). The process then moves to step (10.). If, however, the order does not contain another potential preparation time adjusting factor(s), the process skips step (9.) and moves directly to step (10.). Step (10.) outputs the final preparation time value, taking into account any adjustments that may have been made.

In yet another example, the application 56, using the communications module 47 of the infotainment unit 32, transmits a request for the preparation time of the item to a remote content server 44 affiliated with the vehicle 12 (e.g., part of the center 20 that offers services to the vehicle 12 through the infotainment unit 32). The remote content server 44 may be a dedicated server that receives and responds to the vehicle-related information requests from the application 56. The remote content server 44 is a system of computer hardware and computer readable instructions that is capable of responding to requests from the vehicle 12. The remote content server 44 can automatically look up the preparation time (which may be saved in database(s) 70 of the center 20 or available to the server 44 from another information source) or calculate the preparation time using an algorithm similar to that previously described. The remote content server 44 then returns the preparation time back to the in-vehicle application 56.

In still another example, the application 56 may wirelessly access a published list of preparation times of the merchant/vendor 14. In one example, the merchant/vendor 14 may have a list of items and associated preparation times that it has prepared for and made available to the application 56. In another example, the merchant/vendor 14 may have a list of items and associated preparation times that it has posted on a webpage that is accessible by the application 56. The application 56 may access the published list of preparation times through the carrier/communication system 16.

The application 56 also dynamically determines the estimated time of arrival (ETA or arrival time) of the vehicle 12 at the location of the merchant/vendor 14. To dynamically determine the ETA, the application 56 transmits a request for the ETA from a time of arrival module 62 of the in-vehicle infotainment unit 32. The time of arrival module 62 is in communication with and responsive to both the application 56 and the location detection module 34. The time of arrival module 62 may receive the address information of the selected merchant/vendor 14 from the application 56 and may receive the then-current position of the vehicle 12 from the location detection module 34. The time of arrival module 62 calculates the ETA using these two pieces of information. The time of arrival module 62 may also be programmed to take into account then-current traffic information.

The ETA is transmitted to the application 56 from the time of arrival module 62, which compares the ETA with the preparation time of the merchant/vendor. When the application 56 recognizes that the ETA is greater than (>) the preparation time, the application 56 continues to hold the order in the holding queue.

The ETA changes as the vehicle 12 moves. As such, the application 56 is programmed to update or identify the ETA at predetermined times after receiving the order. In an example, the application 56 may be programmed to determine the ETA and compare the ETA with the preparation time immediately upon receiving the order, and then again at preset or predetermined times after the order is received until the ETA is equal to or less than (≤) the preparation time. The preset times may be continuous or near real-time (e.g., every 0.1 seconds) or longer, e.g., every 1 second to 60 seconds after receiving the order. For example, if the order for the coffee is received at 7:05 am and the initial ETA is greater than the preparation time, the application 56 may be programmed to determine the ETA and compare the ETA with the preparation time at every 0.1 second interval after the order is received until the ETA is equal to or less than (≤) the preparation time.

At each of the preset times after the order is received, the application 56 transmits a new request for the (updated) ETA from the time of arrival module 62. The time of arrival module 62 may use the previously received address information of the selected merchant/vendor 14 and may receive the then-current position (i.e., the position in real-time) of the vehicle 12 from the location detection module 34. At each of the preset times after the order is received, the position of the vehicle 12 may have changed (e.g., moved closer to the location of the merchant/vendor 14) or may not have changed (e.g., vehicle 12 is stuck in traffic), and thus the then-current position of the vehicle 12 is identified at each of the preset times. This updated vehicle location information and the merchant address information is used by the time of arrival module 62 to calculate the (updated) ETA.

At each of the preset times, the (updated) ETA is transmitted to the application 56 from the time of arrival module 62. The application compares the ETA with the preparation time for the item of the merchant/vendor 14. If at the preset time, the application 56 recognizes that the ETA is greater than (>) the preparation time, the application 56 will continue to hold the order in the holding queue and will compare an updated ETA with the preparation time at subsequent preset time(s) until the ETA is equal to or less than (≤) the preparation time. As such, simultaneously with the order being held, the application 56 monitors the changing ETA in order to determine when to send the order to the merchant/vendor 14.

When the application 56 recognizes that the ETA is equal to or less than (≤) the preparation time, the application 56 retrieves the order from the holding queue and sends (via an order transmission module 63 of the communications module 47) the order of the ordered item to the merchant/vendor 14.

The application 56 is programmed to send the order to the merchant/vendor 14 as a message (e.g., data packet). The application 56 may include a packet builder or may utilize the packet builder of the data transmission system 48, which is programmed to make decisions about what packet to send (e.g., bandwidth, data to include, etc.) and to actually build messages/data packages. The message includes at least the item(s) ordered and the user's name. The application 56 may ask the user to input his/her name when making the item selection, or the application 56 may retrieve a name the user previously stored in an application profile.

In some instances the message may also include payment information. This information may be stored in the user's application profile and may be retrieved by the application 56 in response to a user input indicating that the user would like to pay in advance of picking up the order. The payment information may take the form of a credit card number, a debit card number, a gift card number for the merchant/vendor 14, pre-paid points with the merchant/vendor 14, and/or the like, and/or combinations thereof. In some examples, the message to the merchant/vendor 14 may include the user-selected payment information so that the user(s) does/do not have to render payment himself/herself/themselves upon picking up the order.

As mentioned herein and shown in FIG. 1, the infotainment unit 32 includes the location detection module 34, which may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection module 34 may also include, for example, Glonass (i.e., global navigation satellite system), Sbas (i.e., satellite-based augmentation systems), or a D-GPS (differential global positioning system). The location detection module 34 is in communication with the time of arrival module 62, and may or may not be part of an in-vehicle navigation unit.

While not shown, it is to be understood that the in-vehicle infotainment unit 32 may also include a real-time clock (RTC), a short-range wireless antenna, and/or a multi-band or multi-mode antenna. The real-time clock (RTC) provides accurate date and time information to the in-vehicle infotainment unit 32 hardware and software components that may require and/or request date and time information. In an example, the RTC may provide date and time information for the order. In an example, the short-range wireless antenna services the short-range wireless communication unit 50 and the multi-band or multi-mode antenna services the location detection module 34 and the cellular chipset/component 46. The multi-band or multi-mode antenna may, however, handle a variety of services, such as cellular, location (e.g., GPS), radio, short range (e.g., WI-FI™). In other instances, separate antennas are used for each service, or separate antennas are used for certain combinations of services. It is to be understood that the in-vehicle infotainment unit 32 may be implemented without one or more of the above listed components. It is to be further understood that in-vehicle infotainment unit 32 may also include additional components and functionality as desired for a particular end use.

The infotainment unit 32 is also operatively connected to the vehicle bus system 40 (which facilitates communication among the application 56 and the various modules 34, 74, 62, etc.). The vehicle bus system 40 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 40 enables the vehicle 12 to send signals (e.g., real-time bus messages, orders, etc.) from the infotainment unit 32 (and application 56 resident on the memory 54) to various units of equipment and systems both outside the vehicle 12 and within the vehicle 12. The vehicle bus system 40 also enables the vehicle 12 to receive signals at the infotainment unit 32 from various units of equipment and systems both outside the vehicle 12 and within the vehicle 12.

As mentioned above, in some examples, the system 10 also includes the mobile device 18. In an example, the mobile device 18 may be a smart phone, such as a GSM/LTE phone or a GSM/CDMA/LTE phone. In other examples, the mobile device 18 may be any portable device that has at least a location detection module 34' and a time of arrival module 62'. Examples of other mobile devices 18 include a smart watch, helmet, key fob, etc., each of which may be, for example, GPS and cellular/Internet and/or short range wireless communication enabled. It may be desirable for the mobile device 18 to be short range wireless communication enabled when the mobile device 18 is positioned in the vehicle 12, and is used by the vehicle 12 for an Internet connection.

The mobile device 18 may also include physical hardware (e.g., a micro-processor 52') and computer readable instructions stored in a memory 54'. The micro-processor 52' of the mobile device 18 may be similar to processor 52, and is capable of executing the computer readable instructions stored in the memory 54'.

Some examples of the mobile device 18 may include a wireless communications module 47', which, in addition to a short range wireless communication unit 50', also includes a cellular chipset/component 46' for voice communications and a data transmission unit 48' for data transmission. In these examples, the mobile device 18 is capable establishing short range wireless connections and is also capable of making cellular or satellite connections and/or Internet connections (over the wireless carrier/communication system 16).

In some of the examples disclosed herein, the user may place his/her order for an item using his/her mobile device 18. As such, the mobile device 18 may have the application 56' resident on its memory 54'. When the application 56' is resident on the mobile device 18, the user may place his/her order using the mobile device 18 and the vehicle 12 may or may not be involved.

In this example, the in-vehicle application 56' may be downloaded (e.g., from an online application store or marketplace) and stored on the electronic memory 54'. The in-vehicle application 56' includes the user interface and computer readable instructions that enable the user to input his/her item order and merchant/vendor location. The application 56' may be opened using a display of the mobile device 18. In an example, the display is a full-color touch screen display.

The application 56' may or may not require the user to log in. Once opened, the user interface of the application 56' enables the user to select an item that he/she would like to order from a particular merchant/vendor 14 using any of the techniques previously described (e.g., data table, search box, favorites list, etc.).

When the user inputs his/her item selection, the application 56' may be programmed to ask the user which location of the merchant/vendor 14 (if multiple locations are available) the user would like to place the order with. The merchant/vendor 14 location information may be available in the data table, from a mobile device navigation system connected to the location detection module 34', or from an external information source through the carrier/communication system 16. In an example, the external information source is a wirelessly accessible database that contains site information data (building names, addresses, representative structures, etc.). In the examples disclosed herein involving the mobile device 18, the closest locations may be the store or other facility of the merchant/vendor that is the closest in distance or travel time to the mobile device 18. Once obtained by the application 56', the user interface displays the closest merchant/vendor location(s) for the user's selection.

Similar to the application 56, the application 56' receives the order, but does not yet send the order to the selected merchant/vendor 14. Rather, the application 56' is capable of holding the user's order and the merchant/vendor location until an estimated time of arrival of the mobile device 18 correlates with (i.e., is equal to or less than) the preparation time of the merchant/vendor 14 for that particular item. As such, the order is not placed with the merchant/vendor immediately. In the examples disclosed herein, the actual submission of the order to the merchant/vendor 14 is delayed until the arrival time of the mobile device 18 is within a preparation time of the merchant/vendor 14. The application 56' includes a holding queue that stores the order until it is time to send the order to the merchant/vendor 14.

While the order is held in the holding queue, the application 56', in conjunction with one or more modules of the mobile device 18, determines a preparation time of the order item, dynamically determines the estimated time of arrival of the mobile device 18 at the merchant/vendor location, and compares the preparation time with the estimated time of arrival to determine whether the order should be transmitted to the merchant/vendor 14.

In the examples disclosed herein, the application 56' does not contact the merchant/vendor 14 to determine the preparation time. Rather, the application 56' accesses a published list of preparation times, runs an algorithm for determining the preparation time, or requests the preparation time from the remote content server 44.

The application 56' may determine the preparation time in similar ways to the application 56. For example, the application 56' may look up the preparation time for the order item in the data table in the memory 54'. For another example, the application 56, using controller/processor 52', may run an algorithm to determine the preparation time for the particular item. For yet another example, the application 56', using the communications module 47', may transmit a request for the preparation time of the item to a remote content server 44 affiliated with the mobile device 18 (e.g., part of the center 20 that offers services to the mobile device 18). In this example, the remote content server 44 may be a dedicated server that receives and responds to the mobile device-related information requests from the application 56'. As such, in this example, the remote content server 44 is a system of computer hardware and computer readable instructions that is capable of responding to requests from the mobile device 18. The remote content server 44 can automatically look up the preparation time (which may be saved in database(s) 70 of the center 20 or available to the server 44 from another information source) or calculate the preparation time using an algorithm similar to that previously described. The remote content server 44 then returns the preparation time back to the mobile device application 56'. For still another example, the application 56' may wirelessly access a published list of preparation times of the merchant/vendor 14.

The application 56' also dynamically determines the estimated time of arrival (ETA or arrival time) of the mobile device 18 at the location of the merchant/vendor 14. To dynamically determine the ETA, the application 56' transmits a request for the ETA from a time of arrival module 62'. The time of arrival module 62' is in communication with and responsive to both the application 56' and the location detection module 34'. The time of arrival module 62' may receive the address information of the selected merchant/vendor 14 from the application 56' and may receive the then-current position of the mobile device 18 from the location detection module 34'. The time of arrival module 62' calculates the ETA using these two pieces of information. The time of arrival module 62' of the mobile device 18 may prompt the application 56' to inquire as to whether the user is walking, driving, riding a bike, etc. in order to determine a more accurate ETA based upon the user's mode of transportation.

The ETA is transmitted to the application 56' from the time of arrival module 62', which compares the ETA with the preparation time of the merchant/vendor 14. When the application 56' recognizes that the ETA is greater than (>) the preparation time, the application 56] continues to hold the order in the holding queue.

The ETA changes as the mobile device 18 moves. As such, the application 56' is programmed to update or identify the ETA at predetermined times after receiving the order. In an example, the application 56' may be programmed to determine the ETA and compare the ETA with the preparation time immediately upon receiving the order, and then again at preset or predetermines times after the order is received until the ETA is equal to or less than (≤) the preparation time. The preset times may continuous or near real time (e.g., every 0.1 seconds after receiving the order) or longer. For example, if the order for the coffee is received at 7:05 am and the initial ETA is greater than the preparation time, the application 56' may be programmed to determine the ETA and compare the ETA with the preparation time at every 0.1 second interval after the order is received until the ETA is equal to or less than (≤) the preparation time.

At each of the preset times after the order is received, the application 56' transmits a new request for the (updated) ETA from the time of arrival module 62. The time of arrival module 62' may use the previously received address information of the selected merchant/vendor 14 and may receive the then-current position (i.e., the position in real-time) of the mobile device 18 from the location detection module 34'. At each of the preset times after the order is received, the position of the mobile device 18 may have changed (e.g., moved closer to the location of the merchant/vendor 14) or may not have changed (e.g., the user with the mobile device 18 is waiting at a cross-walk), and thus the then-current position of the vehicle 12 is identified at each of the preset times. This updated mobile device location information and the merchant address information is used by the time of arrival module 62' to calculate the (updated) ETA.

At each of the preset times, the (updated) ETA is transmitted to the application 56' from the time of arrival module 62'. The application 56' compares the ETA with the preparation time for the item of the merchant/vendor 14. If at the preset time, the application 56' recognizes that the ETA is greater than (>) the preparation time, the application 56' will continue to hold the order in the holding queue and will compare an updated ETA with the preparation time at subsequent preset time(s) until the ETA is equal to or less than (≤) the preparation time. As such, simultaneously with the order being held, the application 56' monitors the changing ETA in order to determine when to send the order to the merchant/vendor 14.

When the application 56' recognizes that the ETA is equal to or less than (≤) the preparation time, the application 56' retrieves the order from the holding queue and sends (via an order transmission module 63' of the communications module 47') the order of the ordered item to the merchant/vendor 14.

The application 56' is programmed to send the order to the merchant/vendor 14 as a message (e.g., data packet). The application 56' may include a packet builder or may utilize the packet builder of the data transmission system 48', which is programmed to make decisions about what packet to send (e.g., bandwidth, data to include, etc.) and to actually build messages/data packages. The message includes at least the item(s) ordered and the user's name. The application 56' may ask the user to input his/her name when making the item selection, or the application 56' may retrieve a name the user previously stored in an application profile.

The message transmitted by the application 56' may also include payment information (e.g., credit card number, debit card number, gift card number for the merchant/vendor 14, pre-paid points with the merchant/vendor 14, etc.). This information may be stored in the user's application profile and may be retrieved by the application 56' in response to a user input indicating that the user would like to pay in advance of picking up the order.

As mentioned above, the system 10 also includes the center 20. In some of the examples disclosed herein, the user of the vehicle 12 is a customer of the infotainment unit service provider that operates the center 20 and the remote content server 44, and thus the remote content server 44 is in selective communication with the vehicle 12. In other of the examples disclosed herein, the user of the mobile device 18 is a customer of a mobile communications service provider that operates the center 20 and the remote content server 44, and thus the remote content server 44 is in selective communication with the mobile device 18.

The center 20 is capable of communicating with the infotainment unit 32 when the vehicle 12 is within the coverage area of the carrier/communication system 16, and/or with the mobile device 18 when it is within the coverage area of the carrier/communication system 16. In some examples, the center 20 is utilized to obtain the preparation time of the merchant/vendor 14.

In general, the remote content server 44 is a system of computer hardware and computer readable instructions that are capable of retrieving or calculating the preparation time(s) for item(s) in response to a request from the application 56 or 56'. The remote content server 44 may be configured to receive information (e.g., the item to be ordered and the merchant 14) from the infotainment unit 32 or the mobile device 18 in the form of a computer-readable message (an example of which includes packet data). In this example, a communications module 64 receives the computer-readable message, and upon receiving and reviewing the data in the message, the communications module 64 transmits the data to the remote content server 44. The remote content server 44 includes software (to be run by processor 66 or another processor associated with the remote content server 44) that is capable of responding to the request.

In one example, the remote content server 44 may retrieve the merchant/vendor preparation times from the database 70. In another example, the remote content server 44 may run an algorithm to determine the preparation time for the particular item. In still another example, the remote content server 44 may wirelessly access a published list of preparation times of the merchant/vendor 14. The remote content server 44 then transmits the requested information back to the application 56 or 56'.

The center processor 66, which is often used in conjunction with telecommunication and computer equipment 68, is generally equipped with suitable software and/or programs enabling the processor 66 (and remote content server 44) to accomplish a variety of functions. Further, the various operations of the center 20 may be carried out by one or more computers (e.g., computer equipment 68) programmed to carry out some of the tasks of the center 20. The telecommunication and computer equipment 68 (including computers) may include a network of servers (including remote content server 44) coupled to both locally stored and remote databases (e.g., database 70) of any information processed.

The center 20 also includes switch(es) 42. The switch 42 may be a private branch exchange (PBX) switch. The switch routes incoming signals so that voice transmissions are usually sent to either the live advisor 60 or the automated response system 60', and data transmissions are passed on to a modem or other piece of equipment (e.g., communications module 64) for demodulation and further signal processing. The modem preferably includes an encoder, as previously explained, and can be connected to various devices such as the remote content server 44 and database 70.

The center 20 also includes live and/or automated advisors 60, 60'. Each advisor 60, 60' may be associated with a workstation, including telecommunication and computer equipment 68.

The database(s) 70 at the center 20 may be designed to store the merchant's published preparation times, vehicle record(s), subscriber/user profile records, or any other pertinent subscriber and/or vehicle information and/or mobile device information. It is to be understood that the databases 70 may allow the center 20 to function as a repository for data collected from the vehicle 12, the mobile device 18, and/or from the vehicle owner/driver and/or mobile device owner. In some instances, another facility may function as a repository for collected data (e.g., a customer relationship management system (not shown) associated with the center 20 whose database(s) the server 44 or advisors 60, 60' can access).

As illustrated in FIG. 1, the various center 20 components are coupled to one another via a network connection or bus 72, such as one similar to the vehicle bus 40 previously described.

It is to be appreciated that the center 20 may be any central or remote facility, manned or unmanned, mobile or fixed, to or from which it is desirable to exchange voice and data communications. As such, the live advisor 60 may be physically present at the center 20 or may be located remote from the call center 14 while communicating therethrough.

The center 20 shown in FIG. 1 may also be virtualized and configured in a Cloud Computer, that is, in an Internet-based computing environment. For example, the computer equipment 68 may be accessed as a Cloud platform service, or PaaS (Platform as a Service), utilizing Cloud infrastructure rather than hosting computer equipment 68 at the call center 14. The database 70 and remote content server 44 may also be virtualized as a Cloud resource. The Cloud infrastructure, known as IaaS (Infrastructure as a Service), typically utilizes a platform virtualization environment as a service, which may include components such as the processor 66, database 70, remote content server 44 and computer equipment 68.

As shown in FIG. 1, the system 10 also includes the merchant/vendor 14. The merchant/vendor 14 includes a computing device/system 74. The computing device/system 74 includes suitable hardware and computer readable instructions/code that enable it to communicate (e.g., transmit and/or receive data communications) over the carrier/communication system 16 and to receive message(s) from the application 56 and/or 56'. In one example, the computing device/system 74 includes suitable hardware and computer readable instructions/code that enable it to integrate orders received from the application 56 and/or 56' with orders taken directly at the merchant/vendor 14. In another example, the computing device/system 74 is designated for only receiving orders from the application 56 and/or 56'.

Figure 2:
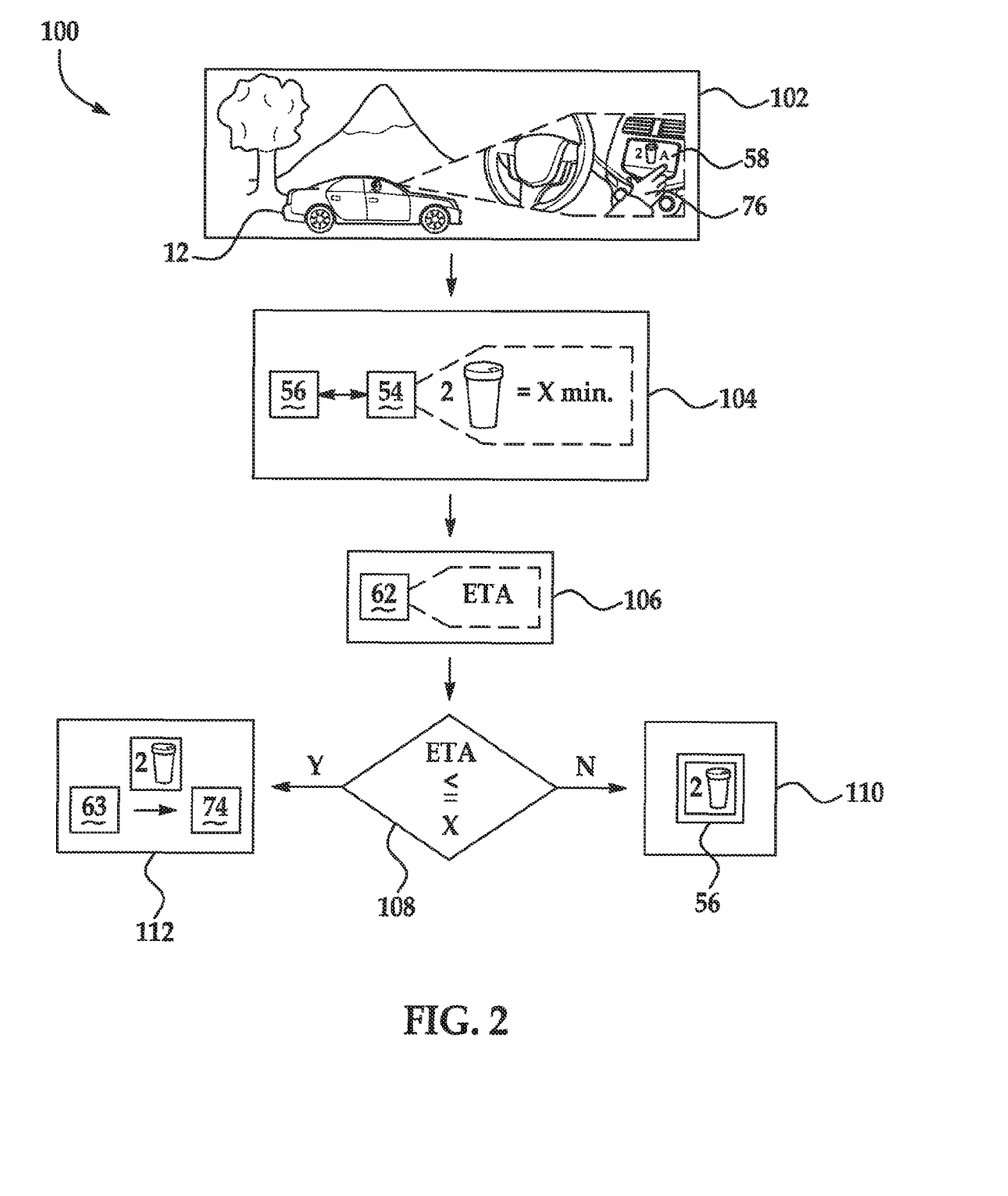
FIG. 2 is a schematic flow diagram illustrating examples of the ordering method.

As mentioned above, the system 10 shown in FIG. 1 enables a user to place an order item(s) with a merchant/vendor using his/her vehicle 12 or mobile device 18. One example of the ordering method involving the vehicle 12 is shown in FIG. 2. It is to be understood that various components of the system 10 of FIG. 1 may be referenced throughout the discussion of FIG. 2, but may not be shown in FIG. 2. Furthermore, it is to be understood that the method 100 may be implemented with the mobile device 18 and the application 56', rather than the vehicle 12 and the application 56.

The method 100 shown in FIG. 2 involves the user 76 inputting his/her item order using the display 58 and the application 56 (reference numeral 102). In this example, the user selects the menu items and the merchant location using the touch screen of the display 58. As depicted, the user 76 places an order for two large lattes from merchant A.

As shown at reference numeral 104, in this example, the application 56 retrieves the preparation time for two large lattes (i.e., X minutes) from the data table saved in the memory 54. In this example, the data table may include the published preparation time for each menu item, and the application 56 may be programmed to calculate the total preparation time for all of the items in the order.

As shown at reference numeral 106, the ETA is then dynamically determined by the time of arrival module 62. The ETA is transmitted to the application 56 from the time of arrival module 62, which compares the ETA with the preparation time of the merchant/vendor (shown at reference numeral 108). When the application 56 recognizes that the ETA is greater than (>) the preparation time, the application 56 continues to hold the order in the holding queue (shown at reference numeral 110). In this example, the application 56 continues (at preset times) to monitor the ETA (reference numeral 106) and compare the ETA with the preparation time (reference numeral 108) until the ETA is equal to or less than ($\leq$) the preparation time.

When the ETA is equal to or less than ($\leq$) the preparation time, the application 56 retrieves the order from the holding queue and sends (via the order transmission module 63 of the communications module 47) the order of the items to the computing device/system 74 of the merchant/vendor 14 (as shown at reference numeral 112). The merchant/vendor 14 then fills the order so that the items are ready for pick up upon the user's arrival.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

When "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. An ordering method, comprising:
receiving, at least one of an in-vehicle application resident on a memory of an in-vehicle infotainment device of a vehicle or a mobile-device application resident on a memory of a mobile device, an order for a product;
without contacting a merchant of the product, accessing, by the at least one of the in-vehicle application or the mobile-device application, a default preparation time for the product;
without contacting the merchant of the product, determining, by the at least one of the in-vehicle application or the mobile-device application, a preparation time adjusting factor that accounts for a time of day at which the order is received, a type of the product being ordered, a typical preparation time of the product, a total size of the order, and historical turn-around time data for the merchant at the time of day;
without contacting the merchant of the product, determining, by the at least one of the in-vehicle application or the mobile-device application, a final preparation time based upon the default preparation time and the preparation time adjusting factor;

receiving, at the at least one of the in-vehicle application or the mobile-device application, a position of the vehicle or the mobile device from a global positioning system at preset times after the order is received;

dynamically determining, by the at least one of the in-vehicle application or the mobile-device application, an estimated time of arrival of the at least one of the vehicle or the mobile device at a location of the merchant at each of the preset times based on the received position; and holding, at the at least one of the in-vehicle application or the mobile-device application, the order for the product until the estimated time of arrival is equal to or less than the final preparation time for the product.

2. The ordering method as defined in claim 1 wherein the determining of the default preparation time for the product further comprises accessing a data table of preparation times stored on the memory of the at least one of the in-vehicle infotainment device or the memory of the mobile device.

3. The ordering method as defined in claim 1 wherein the determining of the preparation time for the product further comprises:

transmitting a request for the default preparation time of the product to a remote content server affiliated with the vehicle or the mobile device; and receiving the default preparation time from the remote content server.

4. The ordering method as defined in claim 1 wherein the determining of the default preparation time for the product further comprises wirelessly accessing a published list of default preparation times of the merchant.

5. The ordering method as defined in claim 1, further comprising:

comparing the estimated time of arrival determined at a first of the preset times with the default preparation time;

recognizing that the estimated time of arrival is not equal to or less than the default preparation time; and in response to the recognizing, initiating the holding.

6. The ordering method as defined in claim 1, further comprising comparing the estimated time of arrival with the final preparation time at each of the preset times.

7. The ordering method as defined in claim 6, further comprising:

recognizing, by the at least one of the in-vehicle application or the mobile-device application, that the estimated time of arrival is equal to or less than the final preparation time;

retrieving the order from a holding queue; and transmitting the order to a computing device of the merchant.

8. The ordering method as defined in claim 6 wherein at a first of the preset times, a result of the comparing indicates that the estimated time of arrival is not less than or equal to the final preparation time, and wherein the method further comprises:

receiving the position at a second of the preset times;

performing the dynamically determining at the second of the preset times; and performing the comparing at the second of the preset times.

9. The ordering method as defined in claim 8 wherein the receiving of the position, and the performing of the dynamically determining and the comparing at the second of the preset times occur simultaneously with the holding of the order.

10. The ordering method as defined in claim 1, further comprising:

recognizing, by the at least one of the in-vehicle application or the mobile-device application, that the estimated time of arrival is equal to or less than the final preparation time;

retrieving the order from a holding queue; and transmitting the order to a computing device of the merchant.

11. The ordering method as defined in claim 1 wherein the preparation time adjusting factor further accounts for special requests associated with the order.

12. An ordering system for a vehicle, comprising:

a microprocessor of an in-vehicle infotainment device of the vehicle;

a memory associated with the microprocessor;

a global positioning system operatively connected to the microprocessor, the global positioning system configured to dynamically detect a position of the vehicle; and an application resident on the memory, the application including computer readable instructions to cause the microprocessor to:

receive an order for a product;

without contacting a merchant of the product, access a default preparation time for the product;

without contacting the merchant of the product, determine a preparation time adjusting factor that accounts for a time of day at which the order is received, a type of the product being ordered, a typical preparation time of the product, a total size of the order, and historical turn-around time data for the merchant at the time of day;

without contacting the merchant of the product, determine a final preparation time for the product based upon the default preparation time and the preparation time adjusting factor;

receive a position of the vehicle from the global positioning system at preset times after the order is received;

dynamically determine an estimated time of arrival of the vehicle at a location of the merchant at each of the preset times based on the received position; and hold the order for the product until the estimated time of arrival is equal to or less than the final preparation time for the product.

13. The ordering system as defined in claim 12, further comprising a data table stored in the memory, the data table containing multiple order items, each item having an associated default preparation time and an associated vendor.

14. The ordering system as defined in claim 12, further comprising a remote content server affiliated with the vehicle, the remote content server to receive a request for the default preparation time of the product and to transmit the default preparation time from the remote content server.

15. The ordering system as defined in claim 12, further comprising:

a data transmission system associated with the application for sending the order to the merchant when the estimated time of arrival is equal to or less than the default preparation time for the product; and a computing device of the merchant to receive the order for the product from the data transmission system.

16. The ordering system as defined in claim 12 wherein the preparation time adjusting factor further accounts for special requests associated with the order.

17. An ordering system, comprising:
- a mobile device;
- a data table containing multiple order items, each order item having an associated preparation time and an associated vendor, wherein at least two of the associated vendors are distinct from each other;
- a global positioning system associated with the mobile device;
- an application on the mobile device including a user interface for receiving a user input of an ordered item selected from at least one of the order items;
- a time of arrival module responsive to the global positioning system and to address information of the associated vendor for the ordered item to determine an arrival time, the time of arrival module including a micro-processor; and
- a data transmission system for sending an order of the ordered item to the associated vendor when the associated preparation time correlates with the arrival time;
- wherein the application includes computer readable instructions to cause the micro-processor to:
  - determine a default preparation time for the ordered item from the data table;
  - without contacting the associated vendor of the ordered item, determine a preparation time adjusting factor that accounts for the default preparation time, time of day at which the order is received, a type of the ordered item, a total size of the order, and historical turn-around time data for the associated vendor at the time of day;
  - without contacting the associated vendor of the ordered item, determine a final preparation time for the ordered item, the final preparation time based upon the default preparation time and the preparation time adjusting factor;
  - receive a position of the mobile device from the global positioning system at preset times after the user input for the ordered item is received;
  - dynamically determine, through the time of arrival module, the arrival time of the mobile device at the associated vendor at each of the preset times based on the received position; and
  - hold the order of the ordered item until the arrival time is equal to or less than the final preparation time for the ordered item.

18. The ordering system as defined in claim 17 wherein the preparation time adjusting factor further accounts for special requests associated with the order.

* * * * *